CARMELI ADAHAN
INVENTOR.

BY John R. Faulkner
Clifford L. Sadler

ATTORNEYS

CARMELI ADAHAN
INVENTOR.

BY John L. Faulkner
Clifford L. Sadler

ATTORNEYS

United States Patent Office 3,496,903
Patented Feb. 24, 1970

3,496,903
LOW TIRE PRESSURE WARNING DEVICE
Carmeli Adahan, Dearborn, Mich., assignor to Ford Motor Corporation, a corporation of Delaware
Filed Mar. 22, 1968, Ser. No. 715,348
Int. Cl. B60c 23/02
U.S. Cl. 116—34      12 Claims

ABSTRACT OF THE DISCLOSURE

A low tire pressure warning device for a pneumatic tire having a sounding disc mounted centrally within the wheel cover on a pressure responsive support means. If the tire pressure drops below an acceptable level, a portion of the support means retracts sufficiently to release the sounding disk. When released, the irregular periphery of the disk rides upon a circular track within the wheel cover to provide an audible signal to the vehicle operator indicating underinflation of the pneumatic tire.

Background of the invention

Automotive vehicle power assistance devices often make conditions of underinflation in the vehicle tires difficult to determine. For example, power steering aids the vehicle driver in overcoming the tendency of the vehicle to turn which normally occurs when a tire is underinflated. Rapid detection of conditions of underinflation of the tires is imperative for the safety of the vehicle occupants as well as for maximum tire life.

This invention provides a low cost, reliable warning device which gives an audible signal to the vehicle operator in the event that the air pressure in one of the vehicle tires drops below a predetermined level. It also provides a mechanism which repositions itself following the correction of a condition of underinflation so as to be automatically ready for later operation without manual adjustment or reassembly.

Brief summary of the invention

A low tire pressure warning device constructed in accordance with this invention includes a pneumatic tire wheel assembly having a pressure responsive means connected thereto. A releasable sounding member is mounted to the pressure responsive means. The pressure responsive means has a portion movable in relation to the air pressure within the tire enclosure. The movable portion is constructed to retain the sounding member to the pressure responsive means during normal tire inflation pressure and to release the sounding member from the pressure responsive means at a preset minimum tire pressure. When the sounding member is released, it is free to rattle, vibrate and tumble within the wheel assembly so as to audibly warn the vehicle operator of a condition of tire underinflation.

Detailed description of a preferred embodiment

Figures 1, 2:
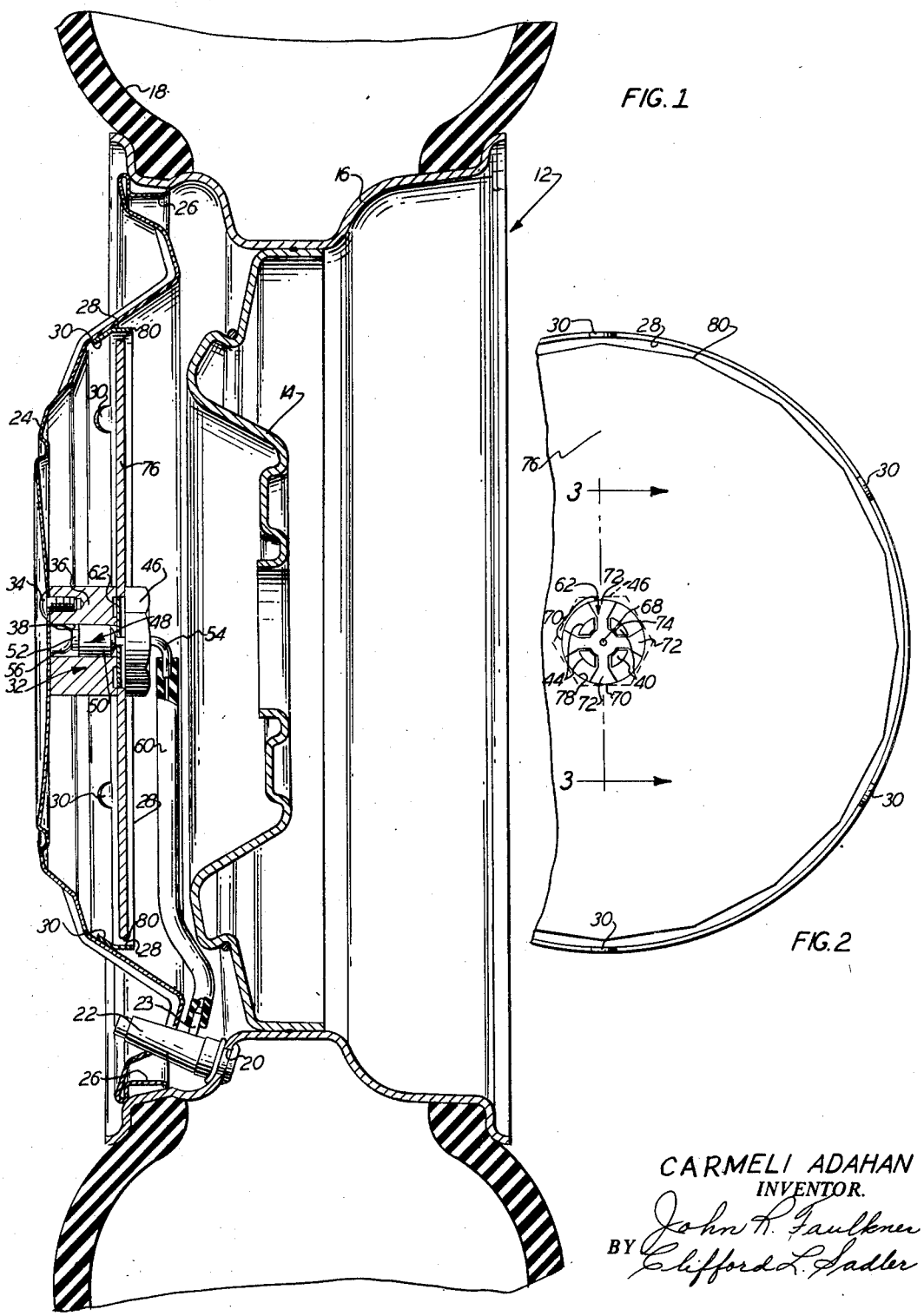
FIGURE 1 is a diametrical cross section of a tire and wheel assembly embodying the invention.
FIGURE 2 is a side view of the sounding ring and its adjacent elements.

In FIGURE 1 of the drawings a wheel assembly is referred to generally by reference numeral 12. The wheel assembly 12 includes a spider portion 14 joined to a rim portion 16. A hole 20 is formed in the rim portion into which a stem valve 22 is mounted. The valve stem includes a side tap 23 which communicates with the tire interior.

A wheel cover 24 is mounted concentrically on the outside of the wheel assembly 12. The wheel cover has a plurality of radially outwardly biased fingers 26 which frictionally retain the wheel cover to the rim portion 16 of the wheel assembly. A concentrically positioned cylindrical track 28 is formed within the wheel cover 24 either by an appropriate stamping process or by attaching a band to the main portion of the wheel cover 24. In the embodiment illustrated by FIGURE 1 of the drawings, track 28 comprises a circular band having a series of tabs 30 which are brazed to the main portion of wheel cover 24.

A pressure responsive means 32 is centrally mounted within the wheel cover by means of a plurality of cap screws 34. The pressure responsive means includes a main body portion 36 having an axially extending bore 38. The axially inner side of the main body portion 36 includes four inwardly extending fingers 40 having radially inwardly facing cylindrical segments 42 of the same radius as the bore 38. The radially outer surfaces 44 of the fingers 40 are threaded to receive a nut 46.

Received within the bore 38 is a hollow piston assembly 48 including a bore engaging element 50 which receives an end piece 52 within one end and a rigid L-shaped tube 54 in its other end. An inflatable, flexible enclosure 56 is received within bore 38 between the wheel cover 24 and the piston assembly 48. A mouth portion 58 of enclosure 56 is sealingly received within end piece 52. The hollow piston assembly 48, L-shaped tube 54, a flexible tube 60 interconnecting tube 54 and valve stem 22 form a continuous passage which provides communication between the enclosure 56 and the interior of the pneumatic tire 18.

A flat support member 62 having the general configuration of a Maltese cross is positioned about the rigid tube 54 and as well as particularly within and between the fingers 40 of the main body portion 36. A compressed coil spring 64 is situated about the axially extending portion of the rigid tube 54 between the support member 62 and an abutment means 66 of the nut 46. The support member 62 has a centrally disposed hole 68 which receives the L-shaped rigid tube 54. The ends 70 of the four legs 72 of member 62 are arcs of a common circle. Similarly, the portion 74 of the periphery of member 62 between the legs 72 are arcs of a common smaller circle having a radius essentially equal to that of bore 38.

Axially positioned between the main body portion 36 and the nut 46 is a generally disc-shaped sounding member 76. A central circular opening 78 is formed in the disc member 76 having a radius approximately equal to the radius of the outer arcs 70 of the support member 62. The outer periphery 80 of the sounding member 76 is irregular and is spaced apart from the track 28 during normal tire inflation. The sounding member 76 is radially supported by the cross-shaped support member 62 which in turn is supported by the fingers 40 of the main body portion 36.

Operation

Figure 3:
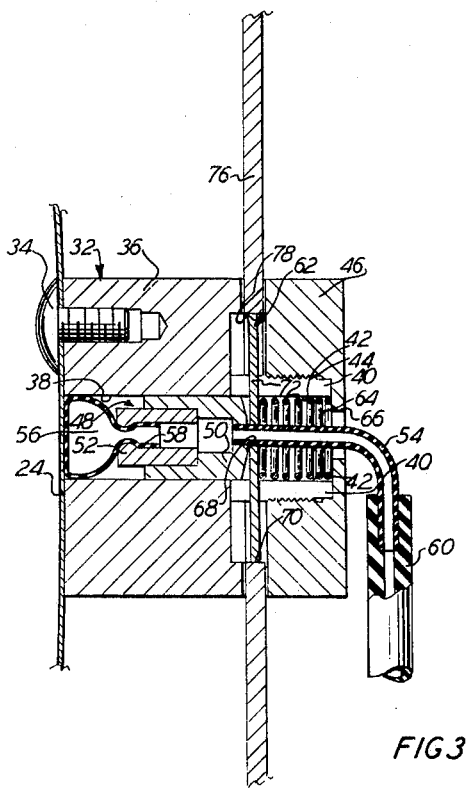
FIGURE 3 is a section view taken along section lines 3—3 of FIGURE 2.
Figure 4:
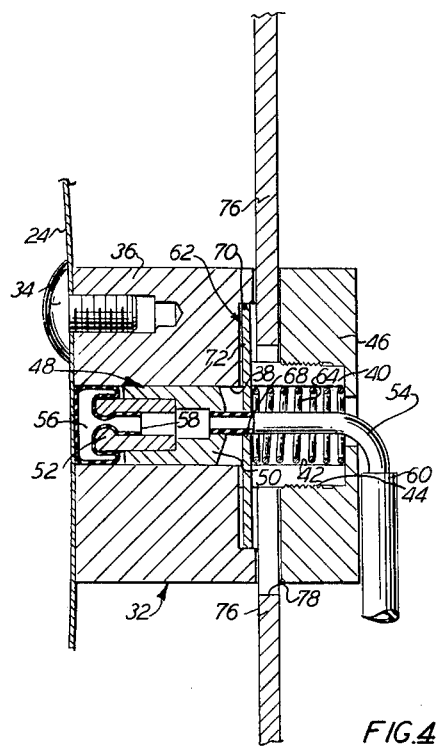
FIGURE 4 is similar to FIGURE 3, but shows the elements in their respective positions at a time of underinflation of the pneumatic tire.

When the air pressure within the tire 18 is normal, the inflatable enclosure 56 forces the piston 48 rightwardly and overcomes the tension of the spring 64 so as to position the support member 62 within the opening 78 of the sounding disc 76, as shown in FIGURE 3. If the pressure within the tire and enclosure 56 drops a preset amount, the spring 64 forces the piston 48 leftwardly and moves the support member 62 to a position to the left of the sounding member 62, at which point the sounding member being no longer centrally supported drops as shown in FIGURE 4 and the periphery 80 engages track 28. The irregular edge 80 of the sounding member 62 rolls and tumbles within and against track 28 and provides an audible signal of low tire pressure to the vehicle operator.

Figure 5:
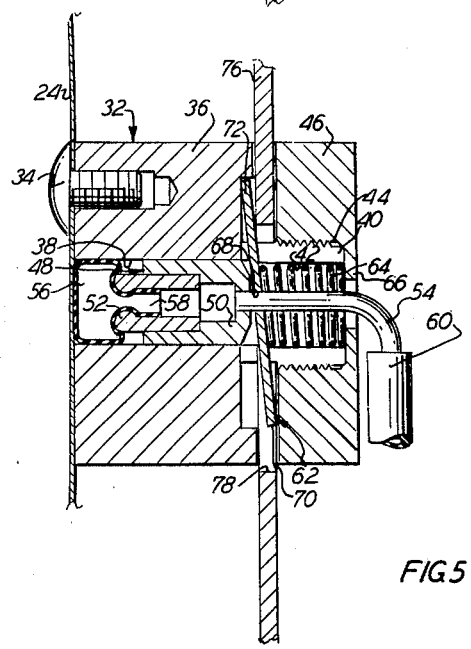
FIGURE 5 is also similar to FIGURE 3, but shows the elements in their relative positions following the correction of a condition of underinflation, but prior to resumption of rotation of the wheels.

After the underinflated tire is returned to normal pressure and the wheel 12 once again begins to rotate, the disk 76 will be automatically recentered and again spaced apart from cylindrical track 28. The recentering process begins as the pressure within the inflatable enclosure 56 moves the piston 48 rightwardly against support member 62 causing the member to cock so that the lower of the legs 62 extend into the opening 78 as shown in FIGURE 5. After a half rotation of the wheel, the disk 76 becomes centered upon and supported by those of legs 62 which extend into the opening 78. As soon as this recentering occurs, the legs 62 that were not initially within the opening 78 are urged into the opening by the force of the inflated enclosure 56 and the elements resume the positions illustrated in FIGURE 3.

The foregoing description presents the presently preferred embodiment of the invention. Modifications and alterations will occur to those skilled in the art that are included within the scope and spirit of the following claims.

What is claimed is:

1. A device for warning of underinflation of an automotive vehicle pneumatic tire comprising:
   a wheel assembly having a pneumatic tire situated thereabout,
   pressure responsive means connected to said wheel assembly having a portion movable in relation to the air pressure within said pneumatic tire,
   a releasable sounding member mounted to said pressure responsive means,
   said movable portion being constructed to retain said sounding member in a fixed position relative to the remainder of said wheel assembly during normal tire inflation pressures and to release said sounding member at a preset minimum tire pressure,
   whereby when the tire pressure is below the predetermined pressure said sounding member is free to rattle, vibrate and tumble within said wheel assembly to audibly warn the vehicle operator of a condition of tire underinflation.

2. A device according to claim 1 an dincluding:
   said sounding member being mounted generally along the axis of said wheel assembly.

3. A device according to claim 1 and including:
   said sounding member being generally disk-shaped and mounted substantially concentrically with said wheel assembly.

4. A device for warning of underinflation of an automotive vehicle pneumatic tire comprising:
   a wheel assembly having a pneumatic tire situated thereabout,
   a wheel cover concentrically positioned on said wheel assembly, said wheel cover including on its axially inward side a generally cylindrical surface concentric with said wheel assembly,
   pressure responsive means mounted within said wheel cover,
   passage means communicating between said pressure responsive means and the interior of said pneumatic tire,
   said pressure responsive means including a portion movable in the axial direction of said wheel assembly in direct relation to the tire pressure,
   a generally disk-shaped sounding member having an irregular peripheral surface, said sounding member being centrally supported within said wheel cover by said movable portion during normal tire inflation and operation, said peripheral surface being within and spaced apart from said cylindrical surface of said wheel cover during normal tire inflation and operation,
   said movable portion moving axially in response to decreasing tire pressure to release its support of said sounding member at a predetermined pressure and to permit the irregular peripheral surface of said member to drop and roll against said cylindrical surface of said wheel cover thereby causing audible signals that indicate underinflation of the penumatic tire.

5. A device according to claim 4 and including:
   said pressure responsive means comprising a body portion having a bore coaxial with said wheel assembly,
   said movable portion comprising a piston means and a support means mounted on said piston means and movable therewith, said piston means being slidingly received within said bore,
   said sounding members having a generally centrally located opening,
   said support means received within said opening during normal tire inflation and operation to support said sounding member concentrically within said wheel cover,
   said support means axially spaced apart from said sounding member during tire underinflation whereby said sounding member is free to drop radially downwardly and engage said cylindrical track.

6. A device according to claim 5 and including:
   said pressure responsive means including a pressure chamber within said bore between said piston means and said wheel cover, said pressure chamber being in communication with the interior of said pneumatic tire through said passage means.

7. A device according to claim 5 and including:
   said pressure responsive means including an inflatable, flexible enclosure received within said bore between said piston means and said wheel cover, said enclosure being in communication with the interior of said pneumatic tire through said passage means.

8. A device according to claim 5 and including:
   said body portion having a plurality of axially extending fingers,
   said support member formed with peripheral recesses which permit said fingers to project through the plane of said support member.

9. A device according to claim 5 and including:
   said sounding member having a circular opening concentric with said wheel assembly,
   said support member comprising a center portion and a plurality of leg portions extending radially outwardly from said center portion,
   the outward ends of said leg portions being arced surfaces of a common cylinder having a radius equal to that of said circular opening in said sounding member.

10. A device according to claim 9 and including:
    said support member having at least one leg portion partially received within said sounding member opening following the correction of a condition of underinflation and prior to a resumption of rotation of the wheel assembly.
    the remaining leg portions of said sounding member being received within said sounding member opening after resumption of rotation of the wheel assembly.

11. A device according to claim 9 and including:
    said body portion having a plurality of axially inwardly extending fingers, said fingers having radially inward facing arced surfaces having a radius common with said bore,
    said fingers extending through the plane of said support member and between the legs of said support member.

12. A device according to claim 11 and including:
compression spring means positioned axially within said fingers urging said support member and said piston means axially outwardly,
said pressure responsive means including an inflatable, flexible enclosure received within said bore between said piston means and said wheel cover, said enclosure being in communication with the exterior of said pneumatic tire through said passage means, said inflatable enclosure when inflated urging said piston means and said support member axially inwardly.

References Cited

UNITED STATES PATENTS

| 2,800,795 | 7/1957 | Trinca | 73—146.3 |
| 2,917,020 | 12/1959 | Rivers | 116—34 |

LOUIS J. CAPOZI, Primary Examiner

U.S. Cl. X.R.

116—67